2,854,368

PROTECTIVE COATINGS FOR METALS

Louis Lionel Shreir, London, England

No Drawing. Application October 31, 1956
Serial No. 619,394

Claims priority, application Great Britain
November 10, 1955

19 Claims. (Cl. 148—6.15)

This invention relates to protective coatings for metals and is concerned with solutions for forming protective coatings on metals.

Solutions of tannins have been used for derusting and for producing protective coatings on rusty steel, although satisfactory tannin coatings have not been produced hitherto on bright or oxide-free steel surfaces. The use of tannins as a soil additive for preventing underground corrosion has also been investigated.

At the same time, solutions of orthophosphoric acid in water, preferably containing dissolved iron and wetting agents, have been used for many years to remove rust from iron and steel, and to produce protective coatings of iron phosphates on the treated iron or steel.

It has now been found that solutions containing at least one tannin, or one or more tannin acids, and phosphoric acid produce coatings on iron or steel which are superior in anti-corrosion protective value to those produced by either of these ingredients, used separately. It has also been found that these solutions have the advantage that they can be applied both to rusted and to bright and rust-free iron or steel. In addition, they may be used to form similar protective coatings on non-ferrous metal surfaces, e. g. zinc, aluminium and magnesium.

According to the present invention, there is provided a solution for forming protective coatings on metals, comprising phosphoric acid of 1 to 8 moles concentration, and at least one tannin, the tannin material being present in a proportion of between 1 and 35% by weight based on the solution.

Desirably, the concentration of phosphoric acid is between 2 and 5 moles.

Preparations of tannin and phosphoric acid for the purposes of this invention should preferably be selected in such manner that tannin remains in solution, since increases in the amounts of phosphoric acid tend to cause precipitation of tannin. Alternatively, tannin may be retained in solution by addition of an organic solvent, such as industrial ethyl alcohol or acetone.

Tannins, which are used extensively in the preparation of leather, may be obtained as aqueous extracts of vegetable materials, such as barks, woods, fruits, leaves and roots. Such extracts are highly complex in nature and contain mixtures of polyphenolic substances, which may be associated with certain sugars. Natural tannin extracts can be classified according to their chemical properties into (a) hydrolysable tannins, (b) condensed tannins and (c) mixed tannins containing both hydrolysable and condensed tannins.

Hydrolysable tannins yield water-soluble products upon hydrolysis with boiling dilute mineral acids, whereas, under these conditions, condensed tannin extracts form precipitates known as phlobathene. This classification corresponds fairly closely to the older classification into "catechol tannins" (condensed) and "pyrogallol tannins" (hydrolysable). Chinese gall (tannic acid), myrobalan, chestnut wood, divi-divi, valonea, sumac and chinchona extracts provide examples of hydrolysable tannins, and cutch, quebracho, mimosa, mangrove, oak, gambier and chestnut bark extracts are examples of condensed tannins.

A particular tannin may vary somewhat in composition according to source, particularly where the extract is made from more than one tissue of the plant. However, quebracho and mimosa extracts do not appear to vary widely in composition.

Phosphoric acid solutions may contain between 1 and 35% by weight of tannin, and preferably between 5 and 12%. As much as 40% by weight of solvent based on the finished solution may be added to retain tannin in solution.

In the preparation of solutions such as those just described, there appears to be a relationship between the concentration of the phosphoric acid and the concentration of the solvent, e. g. alcohol, to dissolve a given amount of tannin. Thus, with 2 M phosphoric acid, 5% Chinese gall can be dissolved, using 10% alcohol, whereas with 4 M acid, 25% alcohol is needed to dissolve 10% tannin.

Solutions of various concentrations of the above tannins have been made up using various concentrations of phosphoric acid and adjusting the amount of alcohol so that the tannin is retained in solution. In all cases, the addition of 2 to 10% tannin to 2 to 5 M acid gave coatings which were more corrosion resistant than coatings produced by a corresponding solution containing phosphoric acid alone. However, quebracho and China gall appeared to be the most effective.

In the following examples, the solid tannin extract is one of the extracts mentioned, and the acid is 4 M phosphoric acid.

| | | | |
|---|---|---|---|
| Solid tannin extract_____g__ | 50 | 100 | 150 |
| Phosphoric Acid (1.75 S. G.)_____ml__ | 250 | 250 | 250 |
| Industrial Alcohol_____ml__ | 200 | 350 | 450 |
| Water to_____l__ | 1 | 1 | 1 |

Solutions containing from 2 to 10% quebracho or Chinese gall in 2 to 5 M phosphoric acid with 20–35% alcohol to maintain the tannin in solution are preferred.

The solutions just referred to may be prepared either (a) by adding the solid tannin extract to 200 mls. of water, heating to dissolve the tannin and adding the phosphoric acid dissolved in alcohol, the solution being then made up to the required volume with water, or (b) by adding the solid extract to 200 mls. of water, heating to dissolve as much as possible of the tannin, and adding the phosphoric acid slowly with constant stirring, the solution being kept cold and the precipitated tannin being dissolved by adding the necessary amount of alcohol (between 200 and 350 mls.) before the solution is made up to the required volume with water.

On allowing the solution to stand, a precipitate may form and settle to the bottom of the solution. It is believed that any such precipitate is not detrimental to the solution and does not reduce its effectiveness in producing protective coatings.

Low concentrations of tannin can be used in acid solutions of 2 M or lower concentration without the addition of alcohol. The following is an example of such a solution:

Solid extract_____gm__ 20
Phosphoric acid (1.75 S. G.)_____mls__ 125
Water to 1 l.

The solution is made by dissolving the tannin in 100 mls. of hot water, cooling and adding the 125 mls. of phosphoric acid slowly, the solution being kept cold and being made up to 1 l.

Solutions of the type described previously may be applied by means of brushes, cloths or wire-wool to corroded, bright or oxide-free ferrous or non-ferrous metal surufaces. Alternatively, metals to be freed from corrosion products and coated with anti-corrosion protective coatings may be immersed in or sprayed with such solutions. The temperature of the solution may be maintained between about 15 and 50° C., depending upon the method of application and the composition of the solution. Solutions containing high percentages of organic solvent are best used between about 15 and 25° C., but solutions which do not contain an organic solvent can be used between about 40 and 50° C. Some solutions may be used at 80 to 100° C., but prolonged heating is not advisable, as it may bring about decomposition of the tannins. Solutions which contain the higher concentrations of phosphoric acid, e. g. 4 M or more, may be used at the lower temperatures, or applied by brushes, etc., but those containing the lower concentrations of phosphoric acid, e. g. 2 M or less, are best used in immersion or spray processes at the higher temperatures.

In a brush application process, the solution may, for instance, be repeatedly applied with a brush until the rust on the metal is dissolved or transformed into a black residue, which is wiped off. Fresh solution is then applied to the rust-free surface and allowed to react for one hour. The excess solution is then wiped off with a cloth, and the treated surface is allowed to dry for at least 24 hours before further treatment. With clean steel, only one application of acid is required. The coating thus formed is more water insoluble than that produced by phosphoric acid alone, and has a considerably higher electrical resistance. These factors result in a coating which has a superior corrosion resistance. The coating may be further protected by oil, lacquer or paint, provided that these substances are compatible with the coating. This type of treatment is preferably carried out with 4 M phosphoric acid solutions containing the tannin extract and alcohol.

Two M phosphoric acid solutions are best used in immersion and spray processes. Articles to be treated are immersed in or sprayed with the solution, which should preferably be heated to between about 40 and 50° C. Rust-free articles should be treated with the solution for about 10 minutes, and suspended so as to permit surplus solution to drain from them. They should then be left for about 24 hours, or until the anti-corrosion protective coating has formed.

I claim:

1. A solution for forming protective coatings on metals, comprising phosphoric acid of 1 to 8 moles concentration, and at least one tannin material in a proportion of between 1 and 35% by weight based on said solution.

2. A protective solution according to claim 1, wherein the concentration of the acid is between 2 and 5 moles.

3. A protective solution according to claim 1, wherein an organic solvent chosen from the group consisting of industrial ethyl alcohol, and acetone, is added to the solution in quantities sufficient to retain the tannin material in said solution.

4. A solution according to claim 3, wherein the solvent is in a proportion of up to 40% by weight based on the finished solution.

5. A protective solution according to claim 1, wherein the tannin material is chosen from the group consisting of Chinese gall, myrobalan, chestnut wood, divi-divi, valonea, sumac, chinchona, cutch, quebracho, mimosa, mangrove, oak, gambier, and chestnut bark extracts.

6. A protective solution according to claim 1, wherein the phosphoric acid solution contains between 5 and 12% by weight of tannin material.

7. A protective solution according to claim 1, wherein 2 to 10% by weight of tannin is in admixture with phosphoric acid having a concentration of between 2 and 5 moles.

8. A protective solution according to claim 7, wherein said solution contains between 20 and 35% by weight of alcohol to maintain the tannin in solution.

9. A method of preparing a protective solution for metals, comprising the steps of adding a solid tannin extract to water, heating the water to dissolve the added tannin, adding phosphoric acid dissolved in alcohol to the aqueous tannin, and making up the resulting phosphoric acid-tannin solution with water to the required volume for 1 to 8 M phosphoric acid, the tannin being in a proportion of between 1 and 35% by weight based on said solution.

10. A process of preparing a protective solution for metals, comprising the steps of adding a solid tannin extract to water, heating the water to dissolve as much as possible of the tannin, adding phosphoric acid to the tannin suspension slowly with stirring whilst keeping the solution cold, redissolving the precipitated tannin material by adding the required amount of alcohol, and making up the resulting solution with water to the volume required for one to eight M phosphoric acid, the tannin being in a proportion by weight of between 1 and 35% based on said solution.

11. A process for forming a protective anticorrosion coating on a metal surface, wherein a solution comprising 1 to 8 M phosphoric acid and tannin material in a proportion of between 1 and 35% by weight based on said solution, is applied to the metal surface.

12. A process according to claim 11, wherein the surface to which the solution is applied is at least partly corroded.

13. A process according to claim 11, wherein the metal surface to which the solution is applied is initially bright and oxide-free.

14. A process for forming an anti-corrosion protective coating on a metal part, comprising the step of immersing said metal part in a solution comprising phosphoric acid of 1 to 8 moles concentration and between 1 and 35% by weight (based on the solution) of tannin material.

15. A process for forming an anti-corrosion protective coating on a metal part, comprising the step of spraying said metal part with a solution comprising 1 to 8 M phosphoric acid and between 1 and 35% by weight (based on the solution) of tannin material.

16. A process for the formation of a protective coating on a metal surface, comprising the steps of repeatedly applying to said surface a protective solution comprising 1 to 8 M phosphoric acid and between 1 and 35% by weight of tannin, until any corrosion product on the metal surface is transformed into a black residue and at least partially dissolved, wiping off said residue, applying fresh protective solution of the same composition to the wiped surface, allowing the fresh protective solution to react with the metal surface for about one hour, wiping off excess solution, and allowing the treated metal surface to dry for at least 24 hours.

17. A process according to claim 16, wherein the treatment is carried out with a 4 M phosphoric acid solution.

18. A process for forming a protective coating on a metal surface, comprising the steps of immersing the article to be treated in a protective solution comprising 1 to 8 M phosphoric acid and between 1 and 35% by weight of tannin based on said solution, the solution being at a temperature of between 40 and 50° C. and the metal being immersed therein for about 10 minutes, allowing the excess solution to drain from the treated surface, and permitting the latter surface to dry for about 24 hours until a protective coating has been formed thereon.

19. A process for forming a protective coating on a metal surface, comprising the steps of spraying the metal surface with a solution comprising 1 to 8 M phosphoric acid and between 1 and 35% by weight of tannin based on said solution, said solution being at a temperature of between 40 and 50° C. and the metal surface being sprayed therewith for a period of about 10 minutes, allowing the excess solution to drain from the treated surface, and permitting the latter surface to dry for about 24 hours until a protective coating has been formed thereon.

References Cited in the file of this patent

UNITED STATES PATENTS

| | | |
|---|---|---|
| 1,303,627 | Baines | May 13, 1919 |
| 1,549,442 | Brown | Aug. 11, 1925 |
| 1,911,537 | Tanner | May 30, 1933 |
| 2,502,441 | Dodd et al. | Apr. 4, 1950 |